(12) United States Patent
Xu et al.

(10) Patent No.: US 11,533,604 B2
(45) Date of Patent: Dec. 20, 2022

(54) METHOD AND SYSTEM FOR CONTROLLING ID IDENTIFIER NETWORK MOBILITY BASED ON PROGRAMMABLE SWITCH

(71) Applicant: Zhejiang Lab, Zhejiang (CN)

(72) Inventors: Qi Xu, Zhejiang (CN); Ruyun Zhang, Zhejiang (CN); Tao Zou, Zhejiang (CN); Hanguang Luo, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 0 days.

(21) Appl. No.: 17/727,838

(22) Filed: Apr. 25, 2022

(65) Prior Publication Data

US 2022/0345872 A1   Oct. 27, 2022

(30) Foreign Application Priority Data

Apr. 26, 2021  (CN) .......................... 202110454677.2

(51) Int. Cl.
| | |
|---|---|
| H04W 8/02 | (2009.01) |
| H04W 8/22 | (2009.01) |
| H04W 48/14 | (2009.01) |
| H04W 40/24 | (2009.01) |
| H04W 84/12 | (2009.01) |

(52) U.S. Cl.
CPC .............. *H04W 8/02* (2013.01); *H04W 8/22* (2013.01); *H04W 40/248* (2013.01); *H04W 48/14* (2013.01); *H04W 84/12* (2013.01)

(58) Field of Classification Search
CPC ....... H04W 8/02; H04W 8/22; H04W 40/248; H04W 48/14; H04W 84/12
See application file for complete search history.

(56) References Cited

U.S. PATENT DOCUMENTS

| | | | | |
|---|---|---|---|---|
| 2009/0168701 | A1* | 7/2009 | White | ................... H04W 88/06 370/328 |
| 2014/0241247 | A1* | 8/2014 | Kempf | .................. H04W 76/12 370/328 |
| 2015/0017985 | A1* | 1/2015 | Safavi | ............... H04W 36/0085 455/436 |
| 2018/0097722 | A1* | 4/2018 | Callard | ................... H04L 45/38 |
| 2020/0296169 | A1* | 9/2020 | Jeuk | ....................... H04L 67/141 |
| 2020/0336376 | A1* | 10/2020 | Mahdi | ...................... G06N 5/04 |

* cited by examiner

*Primary Examiner* — Charles N Appiah
*Assistant Examiner* — Nicole M Louis-Fils
(74) *Attorney, Agent, or Firm* — JCIPRNET

(57) ABSTRACT

The present invention relates to the technical field of network communication, in particular to a method and system for controlling ID identifier network mobility based on a programmable switch. The system includes mobile terminal nodes, mobile access points, programmable switching nodes and control nodes, wherein the control nodes include local control nodes and a global control node, the mobile terminal nodes are connected and communicated with the mobile access points through wireless data links, the mobile access points are connected and communicated with the programmable switching nodes through wired data links, and the programmable switching nodes, the local control nodes and the global control node are connected and communicated in order through control links.

8 Claims, 3 Drawing Sheets

| No. | ID Identifier of Terminal | Location Identifier of Terminal | ID Identifier of Access Point |
|---|---|---|---|
| 1 | 512 | 192.168.13.5 | 101 |
| 2 | 7856 | 192.168.13.5 | 102 |
| 3 | 1529 | 192.168.13.5 | 103 |

| No. | ID Identifier of Terminal | Location Identifier of Terminal | ID Identifier of Access Point |
|---|---|---|---|
| 1 | 512 | 192.168.13.5 | 101 |
| 2 | 7856 | 192.168.13.5 | 102 |
| 3 | 1529 | 192.168.13.5 | 103 |
| 4 | 1839 | 211.71.24.3 | 201 |

METHOD AND SYSTEM FOR CONTROLLING ID IDENTIFIER NETWORK MOBILITY BASED ON PROGRAMMABLE SWITCH

CROSS-REFERENCE TO RELATED APPLICATION

This application claims the priority benefit of China application serial no. 202110454677.2, filed on Apr. 26, 2021. The entirety of the above-mentioned patent application is hereby incorporated by reference herein and made a part of this specification.

BACKGROUND

Technical Field

The present invention relates to the technical field of network communication, in particular to a method and system for controlling ID identifier network mobility based on a programmable switch.

Description of Related Art

Mobile devices, with an exponentially explosive increase in quantity in the world, are gradually replacing the predominance of fixed hosts in the Internet. Moreover, the traffic scale of Wi-Fi and mobile devices will also exceed the Internet traffic of other devices, and the development of the mobile Internet is inevitable. The mobility is not considered for the existing Internet technology based on a TCP/IP protocol stack at the beginning of the design. For example, an IP address has dual attributes including an ID identifier and a location identifier, and it serves as the ID identifier of a network interface of a terminal host in a transport layer and the location identifier of the network interface of the terminal host in network topology in a network layer at the same time. Therefore, when a terminal device is moved from one network location to another one, the IP address representing the location identifier will change, which causes not only a change in an end-to-end routing path but also a change in the ID identifier that is synonymous with the location identifier, thereby resulting in an interruption to a transmission connection and applications.

An ID identifier network represented by MobilityFirst is intended to support seamless host and network mobility by decoupling the dual semantics of the ID identifier and the location identifier of the IP address. Different from the traditional Internet, MobilityFirst assigns a globally unique identifier (GUID) as an ID identifier to each object in the network through different name authentication services, the GUID assigned to the network object will be mapped to a set of network addresses (NA) of the network object, and the network address represents the location identifier of the network object. During communication, MobilityFirst will first map the GUID to the NA, and then use the NA for routing. In that way, when a terminal node is moved, the NA as the location identifier will change, but the GUID as the ID identifier does not need to be changed, thus when the terminal node is reconnected to the network, and it only needs to map the ID identifier to a new location identifier to restore the communication, so that the problem that traditional networks are hard to support mobility is effectively solved.

However, it is difficult to apply and promote because of the poor compatibility between MobilityFirst and existing network equipment. The network protocol stack has been redesigned from the second layer and above for MobilityFirst, most of the existing switching devices and routing devices are hardware devices designed and developed for the TCP/IP protocol stack, and even software switches based on the application layer need to be redesigned according to a specific development platform to realize the protocol stack.

SUMMARY

For this purpose, the present invention provides a method and system for controlling ID identifier network mobility based on a programmable switch, and a software-defined data plane provided by a P4 programmable switch is adopted to flexibly support a protocol stack of a MobilityFirst ID identifier network. The specific technical solution is as follows:

A system for controlling ID identifier network mobility based on a programmable switch includes mobile terminal nodes, mobile access points, programmable switching nodes and control nodes, wherein the control nodes include local control nodes and a global control node, the mobile terminal nodes are connected and communicated with the mobile access points through wireless data links, the mobile access points are connected and communicated with the programmable switching nodes through wired data links, and the programmable switching nodes, the local control nodes and the global control node are connected and communicated in order through control links;

the mobile terminal nodes include smart phones, tablet PCs or other computing devices with a wireless access function; the mobile access points are configured to release wireless network signals and maintain the connection status information with the mobile terminal nodes; the programmable switching nodes are configured to forward messages between network nodes; the local control nodes are configured to maintain the ID identifier information of mobile terminal nodes in a local network; and the global control node is configured to maintain binding relationships between the ID identifiers of mobile terminal nodes in a global network and the location identifiers in the network where the ID identifiers are located.

Further, north-south interface protocols including P4runtime and Bfruntime are used as communication protocols between the programmable switching nodes and the local control nodes, and a typical east-west interface protocol is used between the local control nodes and the global control node.

Further, functional modules of the mobile access point cover a wireless module, a forwarding module, an access detecting module and a local connection status information library, wherein the wireless module is configured to support a wireless access protocol of Wi-Fi/Wi-MAX, the forwarding module is configured for Layer 2 forwarding of data messages and control messages in the network; the access detecting module is configured to detect the access status of the mobile terminal nodes; and the local connection status information library is configured to record the information of currently connected mobile terminal nodes, including an ID identifier and a physical address.

Further, the local control nodes and the global control node are of the same functional module structure, including a topology discovery module, a routing computation module, a mobility management module and a connection status information library.

Further, the mobility management module of the local control nodes is configured to process access request/leave messages reported by the programmable switching nodes, and add/delete/update the information of each connected mobile terminal node in the connection status information library of the local control nodes; and the control connection status information library of the control nodes records the ID identifier and the location identifier of each connected mobile terminal node and the ID identifier of each mobile access point.

Further, the mobility management module of the global control node is configured to process ID-location identifier binding/unbinding messages reported by the local control nodes, and add/delete/update the information of the ID identifier and the location identifier of each mobile terminal node in the connection status information library of the global control node; and the connection status information library of the global control node is configured to record the ID identifier and the location identifier of each connected mobile terminal node, and the ID identifier of each mobile access point.

A method for controlling ID identifier network mobility based on a programmable switch includes the following steps:

Step 1: a mobile terminal node is connected to a mobile access point through a Wi-Fi/WiMAX wireless access protocol;

Step 2: the mobile access point periodically exchanges connection status detection messages with the connected mobile terminal node, and an ID identifier of the connected mobile terminal node is recorded through a local connection status information library;

Step 3: the mobile access point exchanges an access request message and an access leave message with a local control node through a programmable switching node, and the local control node records the ID identifier of the mobile terminal node connected from the subnet through the local connection status information library; and Step 4: the local control node exchanges ID-location identifier binding and unbinding messages with a global control node, and the global control node records binding relationships between the ID identifier of each mobile terminal node in the network and the location identifier of the connected subnet through a global connection status information library.

Further, step 2 specifically includes the following steps:

S2.1: the local connection status information library of the mobile access point records the ID identifier information and the corresponding time to live (TTL) of each mobile terminal node connected to the mobile access point;

S2.2: the mobile access point sends a connection status detection message to the mobile terminal node in the local connection status information library in a unicast manner, and the message is carried on an Ethernet data link layer, including the ID identifier of the mobile access point as a source ID identifier and the ID identifier of the mobile terminal node as a target ID identifier;

S2.3: the mobile access point broadcasts and sends a connection status detection message through a wireless network port, and the message is carried on the Ethernet data link layer, including the ID identifier of the mobile access point of the mobile terminal node as a source ID identifier and the broadcast ID identifier as a target ID identifier;

S2.4: the mobile terminal node receiving the connection status detection message feeds back a connection status response message to the mobile access point, and the message is carried on the Ethernet data link layer, including the ID identifier of the mobile terminal node as a source ID identifier and the ID identifier of the mobile access point as a target ID identifier;

S2.5: the mobile access point receiving the connection status response message adds the ID identifier of the mobile terminal node in the message to the local connection status information library, and updates the TTL of the mobile terminal node; and S2.6: if the local connection status information library still does not receive the connection status response message from the mobile terminal node after a timeout timer alarms, the ID identifier information of the mobile terminal node is deleted.

Further, step 3 specifically includes the following steps:

S3.1: after the ID identifier information of the mobile terminal node is added to the local connection status information library, the mobile access point sends an access request message to the local control node, and the message is carried on the Ethernet data link layer, including a source ID identifier which is the ID identifier of the mobile access point, a target ID identifier which is the ID identifier of the local control node, and a payload which is the ID identifier of the mobile terminal node;

S3.2: after the ID identifier information of the mobile terminal node is deleted from the local connection status information library, the mobile access point sends a leave message to the local control node, and the message is carried on the Ethernet data link layer, including a source ID identifier which is the ID identifier of the mobile access point, a target ID identifier which is the ID identifier of the local control node, and a payload which is the ID identifier of the mobile terminal node;

S3.3: the programmable switching node directly connected to the mobile access point receives the access request message/access leave message, a type field of the message and the target ID identifier are parsed and matched to search the local forwarding rules, and the message is reported to the local control nodes through the north-south interface protocol;

S3.4: the local control node receives the access request message/access leave message, the ID identifier of the corresponding mobile terminal node is added to/deleted from the local connection status information library, then the ID-location identifier binding/unbinding message is reported to the global control node through the east-west interface protocol, and the message includes the ID identifier of the mobile terminal node and the location identifier of the autonomous system (AS) of the sub-network where the local control node is located; and S3.5: the global control node receives the ID-location identifier binding/unbinding message, and the corresponding ID identifier-location identifier binding information is added to/deleted from the global connection status information library.

The present invention has the advantages that:

The present invention can effectively manage the ID identifier and the location identifier of each network node in the ID identifier network, realize decoupling of both, effectively support the mobility of the ID identifier network, and meanwhile flexibly support the mobility management and message forwarding with the help of the programmable switch, and improve the compatibility of the ID identifier network in the existing network.

BRIEF DESCRIPTION OF THE DRAWINGS

In order to explain the technical solutions of the present invention more clearly, the drawings to be used in describing the embodiments will be briefly introduced below. Obviously, the drawings described below are only some embodiments of the present invention. For those of ordinary skills in the art, other drawings can be obtained based on these drawings without creative efforts.

DETAILED DESCRIPTION OF THE EMBODIMENTS

The technical solutions of the present invention will be clearly and completely described below by combining with the drawings and embodiments of the present invention. It is obvious that the described embodiment is only part of, rather than all of, the embodiments of the present invention. On the basis of the embodiments of the present invention, all the other embodiments obtained by those of ordinary skills in the art without creative efforts will fall within the protection scope of the present invention.

Figure 1:
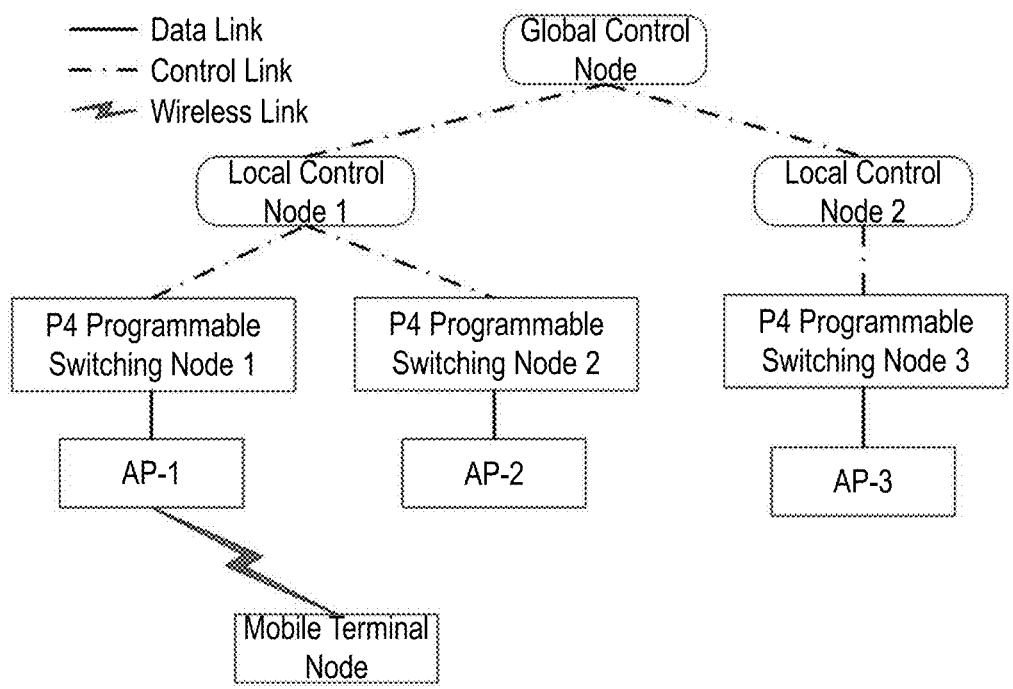
FIG. 1 is a structure diagram of a system for controlling ID identifier network mobility based on a programmable switch provided by an embodiment of the present invention.

As shown in FIG. 1, a system for controlling ID identifier network mobility based on programmable switch of the present invention includes mobile terminal nodes, mobile access points AP, P4 programmable switching nodes in a data plane, and these three kinds of components are communicated through wireless/wired data links; and the system includes control nodes in a control plane, including local control nodes and a global control node, and these two kinds of components are communicated through control links;

Specifically, the mobile terminal nodes are connected and communicated with the mobile access points through wireless data links, the mobile access points are connected and communicated with the programmable switching nodes through wired data links, and the programmable switching nodes, the local control nodes and the global control node are connected and communicated in order through control links;

the mobile terminal nodes include smart phones, tablet PCs or other computing devices with a wireless access function, and support a protocol stack of a MobilityFirst ID identifier network; the mobile access points are configured to release wireless network signals and maintain the connection status information with the mobile terminal nodes; the programmable switching nodes are configured to forward messages between network nodes; the local control nodes are configured to maintain the ID identifier information of mobile terminal nodes in a local network; and the global control node is configured to maintain binding relationships between the ID identifiers of mobile terminal nodes in a global network and the location identifiers in the network where the ID identifiers are located.

P4runtime, Bfruntime and other north-south interface protocols can be used as communication protocols between the programmable switching nodes and the local control nodes, and a typical east-west interface protocol can be used between the local control nodes and the global control node.

Figure 2:
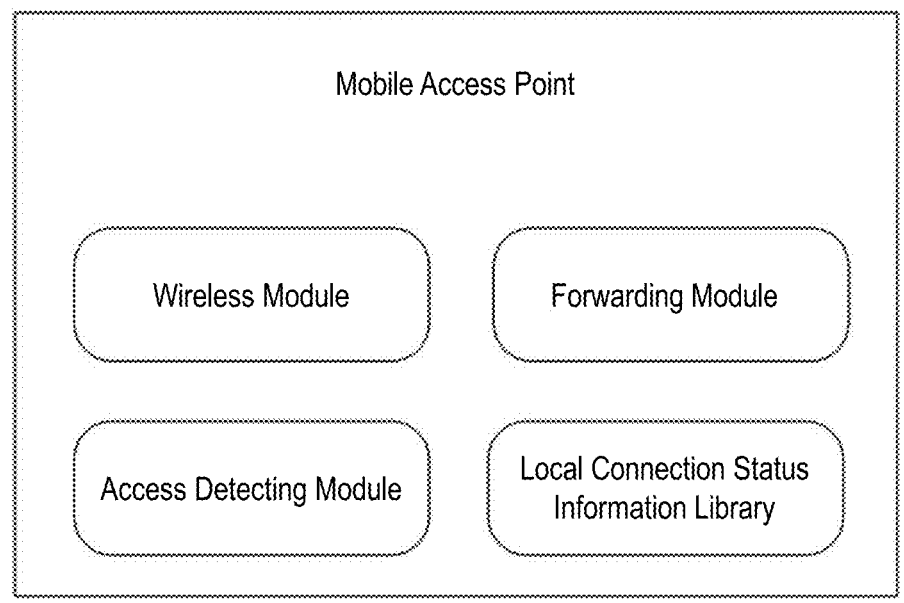
FIG. 2 is a schematic diagram of functional modules of a mobile access point provided by an embodiment of the present invention.

As shown in FIG. 2, functional modules of the mobile access point AP cover a wireless module, a forwarding module, an access detecting module and a local connection status information library, wherein the wireless module is configured to support Wi-Fi/Wi-MAX and other wireless access protocols, the forwarding module is configured to Layer 2 forwarding of data messages and control messages as a data link layer in the network; the access detecting module and the local connection status information library are the key modules of the mobile access points, the former is configured to detect the access status of the mobile terminal nodes, and the latter is configured to record the information of currently connected mobile terminal nodes, such as an ID identifier and a physical address.

The P4 programmable switching nodes can be Bmv2, Tofino and other switching nodes that support the P4 programmability, and they can flexibly support the forwarding of MobilityFirst ID identifier network data messages and control a message uploading control node.

Figures 3, 4, 5:
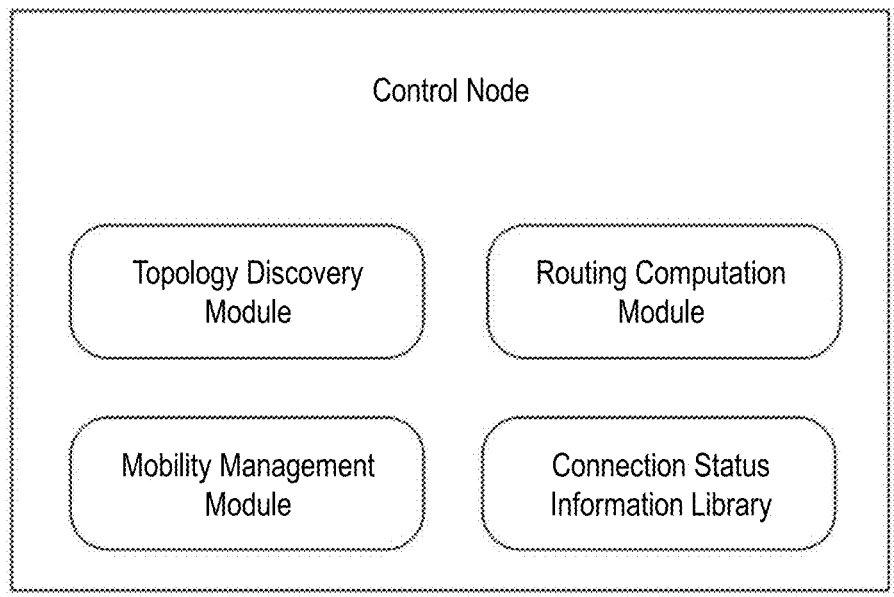
FIG. 3 is a schematic diagram of functional modules of a control model provided by an embodiment of the present invention.
FIG. 4 is a schematic diagram of a local connection status information library provided by an embodiment of the present invention.
FIG. 5 is a schematic diagram of global connection status information library of a global control node provided by an embodiment of the present invention.

As shown in FIG. 3, the local control nodes and the global control node are of the same functional module structure, including a topology discovery module, a routing computation module, a mobility management module and a connection status information library, wherein the topology discovery module and the routing computation module are typical functions of the control nodes to manage the components in the data plane, whereas the mobility management module and the connection status information library are the key functional modules of the embodiment of the present invention.

The mobility management module of the local control nodes is configured to process access request/leave messages reported by the programmable switching nodes, and add/delete/update the information of each connected mobile terminal node in the connection status information library of the local control nodes. The control connection status information library of the control nodes, in which the recorded information items are as shown in FIG. 4, mainly records the ID identifier and the location identifier of each connected mobile terminal node and the ID identifier of each mobile access point.

The mobility management module of the global control node is configured to process ID-location identifier binding/unbinding messages reported by the local control nodes, and add/delete/update the information of the ID identifier and the location identifier of each mobile terminal node in the connection status information library of the global control node. The control connection status information library of the global control node, in which the recorded information items are as shown in FIG. 5, mainly records the ID identifier and the location identifier of each connected mobile terminal node and the ID identifier of each mobile access point.

The system for controlling ID identifier network mobility based on a programmable switch according to the embodiment of the present invention can ensure the separation of an ID identifier and a location identifier, and can effectively manage the mobility of a mobile terminal node by the local/global control nodes through the programmable switching nodes and the mobile nodes, thereby ensuring that the end-to-end connection of the mobile terminal node is not interrupted before and after the network location is changed.

According to an embodiment of the present invention, a method for controlling ID identifier network mobility based on a programmable switch is also provided, and the method can be realized by using the above system.

Figure 6:
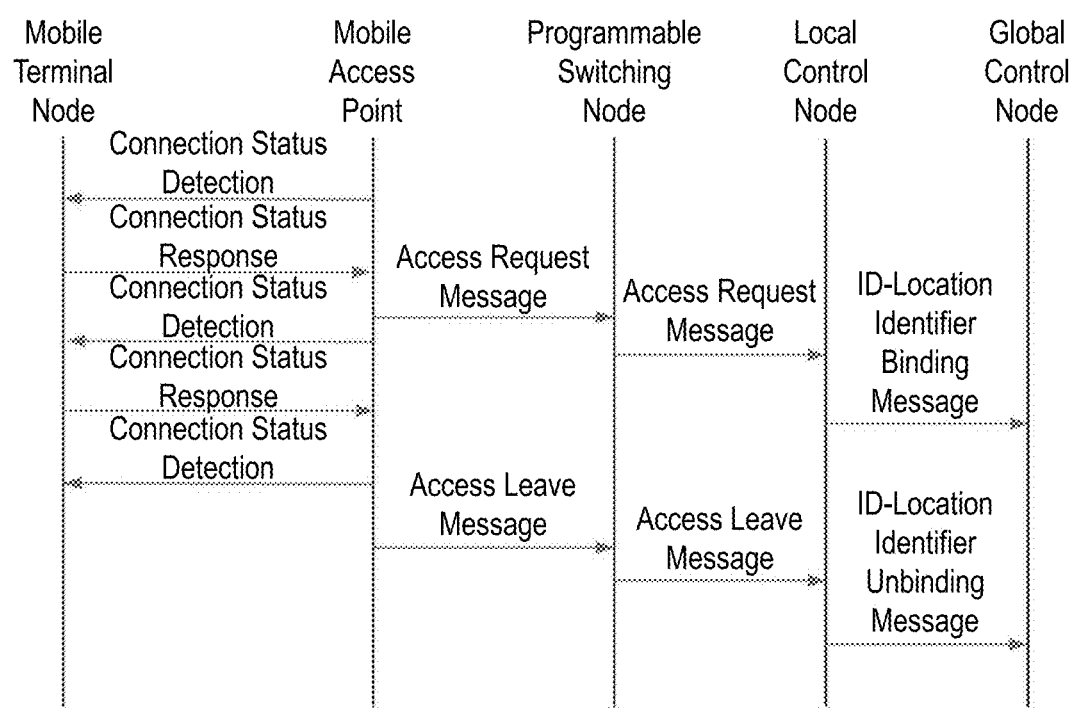
FIG. 6 is a flow chart of a method for controlling ID identifier network mobility based on a programmable switch provided by an embodiment of the present invention.

As shown in FIG. 6, the method for controlling ID identifier network mobility based on a programmable switch mainly includes the following steps:

Step 1: a mobile terminal node is connected in proximity to a mobile access point through Wi-Fi/WiMAX or other wireless access protocol;

Step 2: the mobile access point periodically exchanges connection status detection messages with the connected mobile terminal node, the mobile access point maintains a local connection status information library, and the local connection status information library records an ID identifier of the connected mobile terminal node from the mobile access point;

Step 3: the mobile access point exchanges an access request message and an access leave message with a local control node through a programmable switching node, the local control node maintains the local connection status information library, and the local control node records the ID identifier of the mobile terminal node connected from the subnet; and Step 4: the local control node exchanges ID-location identifier binding and unbinding messages with a global control node, and the global control node maintains a global connection status information library, and the information library records binding relationships between the ID identifier of each mobile terminal node in the network and the location identifier of the connected subnet.

Wherein step 2 mainly includes the following sub-steps:

S2.1: the local connection status information library of the mobile access point records the ID identifier information and the corresponding time to live (TTL) of each mobile terminal node connected to the mobile access point;

S2.2: the mobile access point sends a connection status detection message to the mobile terminal node in the local connection status information library in a unicast manner, and the message is carried on an Ethernet data link layer, including the ID identifier of the mobile access point as a source ID identifier and the ID identifier of the mobile terminal node as a target ID identifier;

S2.3: the mobile access point broadcasts and sends a connection status detection message through a wireless network port, and the message is carried on the Ethernet data link layer, including the ID identifier of the mobile access point of the mobile terminal node as a source ID identifier and the broadcast ID identifier as a target ID identifier;

S2.4: the mobile terminal node receiving the connection status detection message feeds back a connection status response message to the mobile access point, and the message is carried on the Ethernet data link layer, including the ID identifier of the mobile terminal node as a source ID identifier and the ID identifier of the mobile access point as a target ID identifier;

S2.5: the mobile access point receiving the connection status response message adds the ID identifier of the mobile terminal node in the message to the local connection status information library, and updates the TTL of the mobile terminal node;

S2.6: if the local connection status information library still does not receive the connection status response message from the mobile terminal node after a timeout timer alarms, the ID identifier information of the mobile terminal node is deleted.

Step 3 mainly includes the following sub-steps:

S3.1: after the ID identifier information of the mobile terminal node is added to the local connection status information library, the mobile access point sends an access request message to the local control node, and the message is carried on the Ethernet data link layer, including a source ID identifier which is the ID identifier of the mobile access point, a target ID identifier which is the ID identifier of the local control node, and a payload which is the ID identifier of the mobile terminal node;

S3.2: after the ID identifier information of the mobile terminal node is deleted from the local connection status information library, the mobile access point sends a leave message to the local control node, and the message is carried on the Ethernet data link layer, including a source ID identifier which is the ID identifier of the mobile access point, a target ID identifier which is the ID identifier of the local control node, and a payload which is the ID identifier of the mobile terminal node;

Step 3.3: the programmable switching node directly connected to the mobile access point receives the access request message/access leave message, a type field of the message and the target ID identifier are parsed and matched to search the local forwarding rules, and it can be known that it needs to report the message to the local control nodes through the north-south interface protocol;

S3.4: the local control node receives the access request message/access leave message, the ID identifier of the corresponding mobile terminal node is added to/deleted from the local connection status information library, then the ID-location identifier binding/unbinding message is reported to the global control node through the east-west interface protocol, and the message includes the ID identifier of the mobile terminal node and the location identifier of the autonomous system (AS) of the sub-network where the local control node is located; and S3.5: the global control node receives the ID-location identifier binding/unbinding message, and the corresponding ID identifier-location identifier binding information is added to/deleted from the global connection status information library.

As mentioned above, the method provided by the embodiment of the present invention can effectively manage the ID identifier and the location identifier of each network node in the ID identifier network, realize decoupling of both, effectively support the mobility of the ID identifier network, and meanwhile flexibly support the forwarding of mobility control messages with the help of the programmable switch, and improve the compatibility of the ID identifier network in the existing network.

The above are only the preferred embodiments of the present invention and are not intended to limit the present invention. For those skilled in the art, various changes and modifications of the present invention can be made. Any modification, equivalent alternation or improvement within the spirit and principle of the present invention should fall within the protection scope of the present invention.

What is claimed is:

1. A system for controlling ID identifier network mobility based on a programmable switch, comprising mobile terminal nodes, mobile access points, programmable switching nodes and control nodes, wherein the control nodes comprise local control nodes and a global control node, the mobile terminal nodes are connected and communicated with the mobile access points through wireless data links based on Wi-Fi/WiMAX wireless access protocol, the mobile access points are connected and communicated with the programmable switching nodes through wired data links, and the programmable switching nodes, the local control nodes and the global control node are connected and communicated in order through control links; and the mobile terminal nodes comprise smart phones, tablet PCs or other computing devices with a wireless access function; the mobile access points are configured to release wireless network signals and periodically exchange connection status information with the mobile terminal nodes, wherein ID identifiers of the mobile terminal nodes are recorded through a local connection status information library; the programmable switching nodes are configured to forward access request/leave messages between the mobile access points and the local control nodes; the local control nodes are configured to maintain ID identifier information of the mobile terminal nodes in a subnet of a a local network through the local connection status information library and exchange ID-location identifier binding/unbinding messages with the global control node; and the global control node is configured to maintain binding relationships between ID identifiers of the mobile terminal nodes in a global network and location identifiers of the connected subnet in a network where the ID identifiers are located through a global connection status information library, wherein the mobile access points periodically exchange the connection status information with the mobile terminal nodes by:

connecting to the mobile terminal nodes, wherein the local connection status information library of the mobile access points records the ID identifier information and a corresponding time to live (TTL) of the mobile terminal nodes connected to the mobile access points;

sending connection status detection messages to the mobile terminal nodes in the local connection status information library in unicast manners, and the connection status detection messages are carried on Ethernet data link layers, comprising ID identifiers of the mobile access points as source ID identifiers and the ID identifiers of the mobile terminal nodes as target ID identifiers;

broadcasting and sending the connection status detection messages through wireless network ports, and the connection status detection messages are carried on the Ethernet data link layers, comprising the ID identifiers of the mobile access points as the source ID identifiers and broadcasted ID identifiers as the target ID identifiers;

receiving connection status response messages feed-backed from the mobile terminal nodes receiving the connection status detection messages, and the connection status response messages are carried on the Ethernet data link layers, comprising the ID identifiers of the mobile terminal nodes as the source ID identifiers and the ID identifiers of the mobile access points as the target ID identifiers; and adding the ID identifiers of the mobile terminal nodes in the connection status response messages to the local connection status information library, and updating the TTL of the mobile terminal nodes, wherein if the local connection status information library still does not receive the connection status response messages from the mobile terminal nodes after a timeout timer alarms, the ID identifier information of the mobile terminal nodes are deleted.

2. The system for controlling ID identifier network mobility based on a programmable switch of claim 1, wherein north-south interface protocols comprising P4runtime and Bfruntime are used as communication protocols between the programmable switching nodes and the local control nodes, and a east-west interface protocol is used between the local control nodes and the global control node.

3. The system for controlling ID identifier network mobility based on a programmable switch of claim 1, the mobile access points comprising a wireless circuit, a forwarding circuit, an access detecting circuit and the local connection status information library, wherein the wireless circuit is configured to support a wireless access protocol of Wi-Fi/Wi-MAX, the forwarding circuit is configured for Layer 2 forwarding of data messages and control messages in the network; the access detecting circuit is configured to detect access status of the mobile terminal nodes; and the local connection status information library is configured to record information of currently connected mobile terminal nodes, comprising an ID identifier and a physical address.

4. The system for controlling ID identifier network mobility based on a programmable switch of claim 1, wherein the local control nodes and the global control node are of the same functional module structure, comprising a topology discovery module, a routing computation module, a mobility management module and a connection status information library.

5. The system for controlling ID identifier network mobility based on a programmable switch of claim 4, wherein the mobility management module of the local control nodes is configured to process the access requests/leave messages reported by the programmable switching nodes, and add/delete/update information of a connected mobile terminal node in the connection status information library of the local control nodes; and the control connection status information library of the local control nodes is configured to record an ID identifier and a location identifier of the connected mobile terminal node and an ID identifier of a mobile access point.

6. The system for controlling ID identifier network mobility based on a programmable switch of claim 4, wherein the mobility management module of the global control node is configured to process the ID-location identifier binding/unbinding messages reported by the local control nodes, and add/delete/update information of an ID identifier and a location identifier of a mobile terminal node in the connection status information library of the global control node; and the connection status information library of the global control node is configured to record the ID identifier and the location identifier of the connected mobile terminal node, and an ID identifier of mobile access point.

7. A method for controlling ID identifier network mobility based on a programmable switch, comprising the following steps:

Step 1: a mobile terminal node connecting to a mobile access point through a Wi-Fi/WiMAX wireless access protocol;

Step 2: the mobile access point periodically exchanging connection status detection messages with the connected mobile terminal node, and an ID identifier of the connected mobile terminal node is recorded through a local connection status information library;

Step 3: the mobile access point exchanging an access request message and an access leave message with a local control node through a programmable switching node, and the local control node records the ID identifier of the mobile terminal node connected from a subnet through the local connection status information library; and Step 4: the local control node exchanging ID-location identifier binding/unbinding message with a global control node, and the global control node records binding relationships between ID identifiers of all mobile terminal nodes in a network and a location identifier of the connected subnet through a global connection status information library, wherein step 2 specifically comprises the following sub-steps:

S2.1: the local connection status information library of the mobile access point recording ID identifier information and a corresponding time to live (TTL) of the mobile terminal node connected to the mobile access point;

S2.2: the mobile access point sending a connection status detection message to the mobile terminal node in the local connection status information library in a unicast manner, and the connection status detection message carrying on an Ethernet data link layer, comprising an ID identifier of the mobile access point as a source ID identifier and the ID identifier of the mobile terminal node as a target ID identifier;

S2.3: the mobile access point broadcasting and sending the connection status detection message through a wireless network port, and the connection status detection message is carried on the Ethernet data link layer, comprising the ID identifier of the mobile access point as the source ID identifier and a broadcasted ID identifier as the target ID identifier;

S2.4: the mobile terminal node receiving the connection status detection message feeding back a connection status response message to the mobile access point, and the connection status response message is carried on the Ethernet data link layer, comprising the ID identifier of the mobile terminal node as the source ID identifier and the ID identifier of the mobile access point as the target ID identifier;

S2.5: the mobile access point receiving the connection status response message adding the ID identifier of the mobile terminal node in the connection status response message to the local connection status information library, and updates the TTL of the mobile terminal node; and S2.6: if the local connection status information library still does not receive the connection status response message from the mobile terminal node after a timeout timer alarms, the ID identifier information of the mobile terminal node deleting.

8. The method for controlling ID identifier network mobility based on a programmable switch of claim 7, wherein step 3 specifically comprises the following sub-steps:

S3.1: after the ID identifier information of the mobile terminal node is added to the local connection status information library, the mobile access point sending the access request message to the local control node, and the access request message is carried on the Ethernet data link layer, comprising the source ID identifier which is an ID identifier of the mobile access point, the target ID identifier which is an ID identifier of the local control node, and a payload which is the ID identifier of the mobile terminal node;

S3.2: after the ID identifier information of the mobile terminal node is deleted from the local connection status information library, the mobile access point sending a leave message to the local control node, and the leave message is carried on the Ethernet data link layer, comprising the source ID identifier which is the ID identifier of the mobile access point, the target ID identifier which is the ID identifier of the local control node, and the payload which is the ID identifier of the mobile terminal node;

S3.3: the programmable switching node directly connected to the mobile access point receives the access request message/leave message, a type field of the access request message/leave message and the target ID identifier are parsing and matching to search local forwarding rules, and the access request message/leave message is reported to the local control node through a north-south interface protocol;

S3.4: the local control node receives the access request message/leave message, an ID identifier of a corresponding mobile terminal node adding to/deleting from the local connection status information library, then the ID-location identifier binding/unbinding message reporting to the global control node through an east-west interface protocol, and the ID-location identifier binding/unbinding message comprises the ID identifier of the mobile terminal node and the location identifier of an autonomous system (AS) of the subnet where the local control node is located; and S3.5: the global control node receiving the ID-location identifier binding/unbinding message, and corresponding ID identifier-location identifier binding information is added to/deleted from the global connection status information library.

* * * * *